US008806382B2

(12) United States Patent
Matsuda

(10) Patent No.: US 8,806,382 B2
(45) Date of Patent: Aug. 12, 2014

(54) TERMINAL DEVICE AND CONTROL PROGRAM THEREOF

(75) Inventor: Masayuki Matsuda, Kanagawa (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 240 days.

(21) Appl. No.: 13/043,068

(22) Filed: Mar. 8, 2011

(65) Prior Publication Data

US 2011/0237303 A1    Sep. 29, 2011

(30) Foreign Application Priority Data

Mar. 24, 2010    (JP) .................................. 2010-067234

(51) Int. Cl.
*G06F 3/033* (2013.01)

(52) U.S. Cl.
USPC ........... 715/863; 345/107; 345/173; 345/901; 715/776

(58) Field of Classification Search
USPC ........... 345/173–183, 901, 107; 715/776, 863
See application file for complete search history.

(56) References Cited

U.S. PATENT DOCUMENTS

| | | | | |
|---|---|---|---|---|
| 5,463,725 | A * | 10/1995 | Henckel et al. ............... | 715/776 |
| 6,545,669 | B1 | 4/2003 | Kinawi et al. | |
| 7,522,153 | B2 * | 4/2009 | Ohtsuka ....................... | 345/156 |
| 8,314,777 | B2 | 11/2012 | Ikeda et al. | |
| 8,499,251 | B2 | 7/2013 | Petschnigg et al. | |
| 8,564,543 | B2 | 10/2013 | Chaudhri | |
| 2004/0212602 | A1 | 10/2004 | Nako et al. | |
| 2007/0242421 | A1 * | 10/2007 | Goschin et al. ............... | 361/681 |
| 2008/0040692 | A1 * | 2/2008 | Sunday et al. ................ | 715/863 |
| 2008/0062141 | A1 | 3/2008 | Chandhri | |
| 2009/0262091 | A1 | 10/2009 | Ikeda et al. | |
| 2009/0267909 | A1 | 10/2009 | Chen et al. | |
| 2009/0322689 | A1 | 12/2009 | Kwong et al. | |
| 2010/0066643 | A1 | 3/2010 | King et al. | |
| 2010/0175018 | A1 * | 7/2010 | Petschnigg et al. .......... | 715/776 |

(Continued)

FOREIGN PATENT DOCUMENTS

| CN | 201181467 | 1/2009 |
|---|---|---|
| CN | 101382854 | 3/2009 |

(Continued)

OTHER PUBLICATIONS

Extended European Search Report dated May 7, 2013; Application No. 11156941.4.

(Continued)

*Primary Examiner* — Alexander S Beck
*Assistant Examiner* — Amen Bogale
(74) *Attorney, Agent, or Firm* — Young & Thompson

(57) ABSTRACT

In a terminal device 10, two rectangular casings 11A, 11B are connected by a hinge section 12, and touch screens TD1, TD2 of the same shape and size (rectangular) are arranged on substantially the entire inner surface thereof, respectively. When a slide operation performed on at least one of the touch screens TD1, TD2 is detected with the two vertically long casings 11A, 11B being horizontally aligned (horizontally opened state), a control section 1 identifies the touch screen on which the slide operation has been performed as an operation screen and performs display control corresponding to the slide operation on the touch screens TD1, TD2 including the operation screen and a touch screen related thereto (such as an adjacent screen). For example, it sequentially performs page turning on display information on the touch screens TD1, TD2, as display control corresponding to the slide operation.

10 Claims, 9 Drawing Sheets

(56) References Cited

U.S. PATENT DOCUMENTS

| | | | |
|---|---|---|---|
| 2011/0102314 A1* | 5/2011 | Roux | 345/156 |
| 2011/0161889 A1* | 6/2011 | Scheer et al. | 715/863 |
| 2011/0209102 A1* | 8/2011 | Hinckley et al. | 715/863 |
| 2013/0290895 A1 | 10/2013 | Petschnigg et al. | |
| 2013/0298069 A1 | 11/2013 | Petschnigg et al. | |

FOREIGN PATENT DOCUMENTS

| | | |
|---|---|---|
| CN | 101382861 | 3/2009 |
| CN | 101512473 | 8/2009 |
| JP | 2008-217647 | 9/2008 |
| JP | 2009-211547 | 9/2009 |
| JP | 2010-015239 | 1/2010 |
| WO | 2010-080258 | 7/2010 |

OTHER PUBLICATIONS

JP Office Action dated Oct. 3, 2013, with English translation; Application No. 2010-067234.

CN Office Action dated Oct. 10, 2013 with English Translation; Application No. 201110075347.9.

Japanese Official Action—2010-067234—Mar. 28, 2014.

Second Chinese Office Action dated Jun. 13, 2014 in corresponding Chinese Patent Application No. 201110075347.9.

* cited by examiner

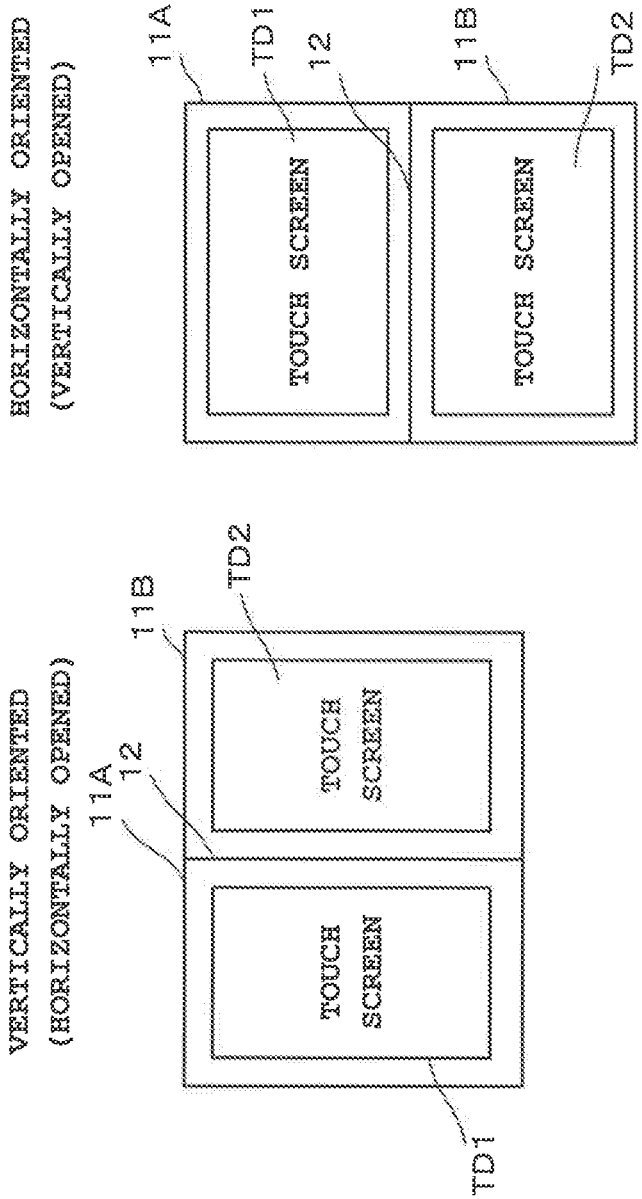

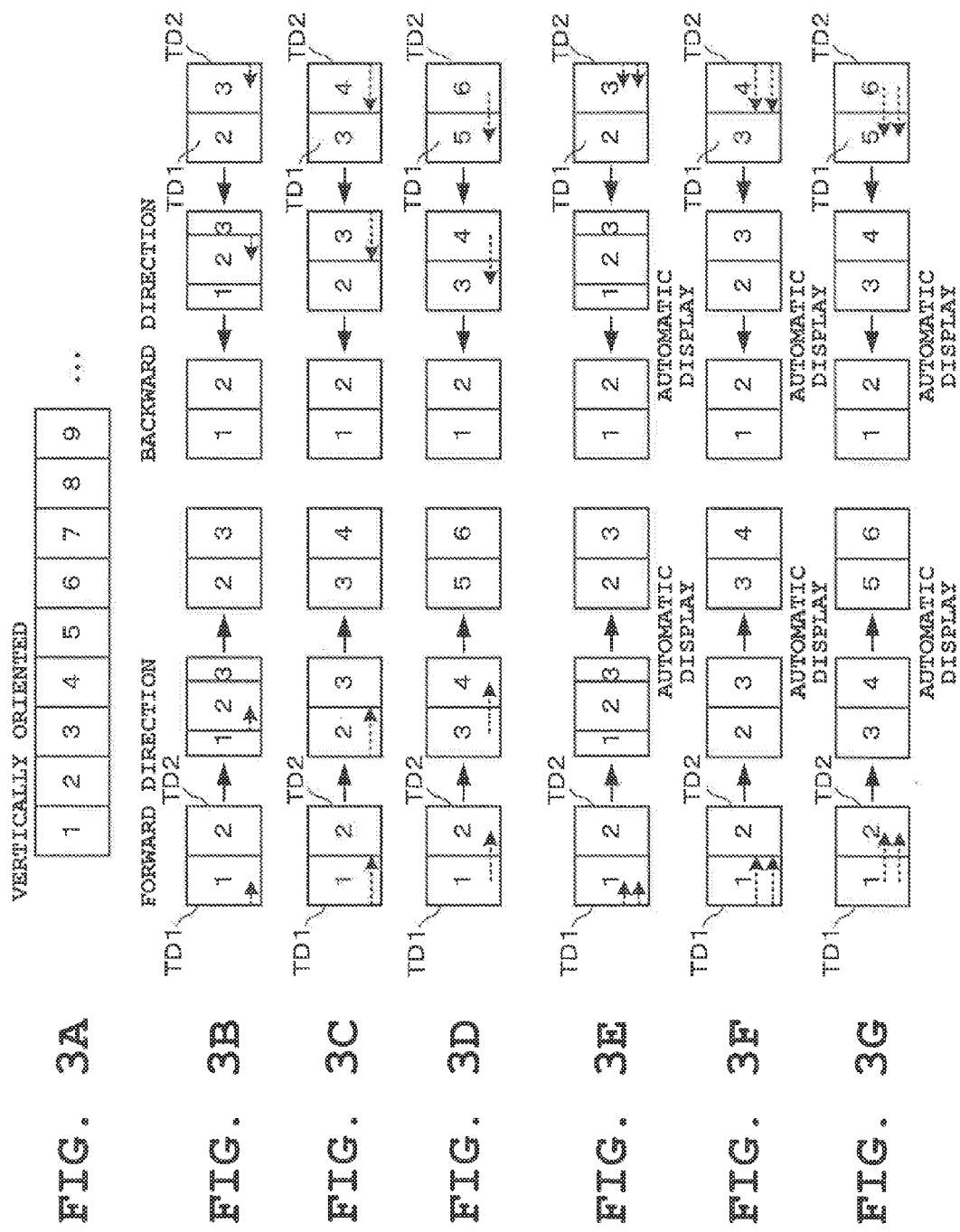

VERTICALLY ORIENTED

FORWARD DIRECTION    BACKWARD DIRECTION

AUTOMATIC DISPLAY    AUTOMATIC DISPLAY

AUTOMATIC DISPLAY    AUTOMATIC DISPLAY

AUTOMATIC DISPLAY    AUTOMATIC DISPLAY

FIG. 5

OPERATION TABLE

| TYPE OF OPERATION | | | TERMINAL ORIENTATION | DISPLAY CONTROL |
|---|---|---|---|---|
| SINGLE TOUCH | OPERATION WITHIN SINGLE SCREEN | SLIDE OPERATION WITHIN HALF OF HORIZONTAL SCREEN WIDTH | HORIZONTALLY ORIENTED | SCROLL DISPLAY CONTENT IN SLIDING DIRECTION BY AMOUNT EQUIVALENT TO SLIDE LENGTH |
| | | | VERTICALLY ORIENTED | |
| | | SLIDE OPERATION EXCEEDING HALF OF HORIZONTAL SCREEN WIDTH | HORIZONTALLY ORIENTED | SCROLL DISPLAY CONTENT IN SLIDING DIRECTION BY AMOUNT EQUIVALENT TO SINGLE PAGE |
| | | | VERTICALLY ORIENTED | |
| | | TOUCH OPERATION | | STOP AUTOMATIC SCROLLING OF DISPLAY CONTENT OR AUTOMATIC PAGE-TURNING |
| | SLIDE OPERATION ACROSS PLURALITY OF SCREENS | | HORIZONTALLY ORIENTED | TURN PAGE IN SLIDING DIRECTION BY AMOUNT EQUIVALENT TO NUMBER OF OPERATION SCREENS |
| | | | VERTICALLY ORIENTED | |
| MULTI-TOUCH | OPERATION WITHIN SINGLE SCREEN | SLIDE OPERATION WITHIN HALF OF HORIZONTAL SCREEN WIDTH | HORIZONTALLY ORIENTED | AUTOMATICALLY SCROLL DISPLAY CONTENT IN SLIDING DIRECTION IN UNITS OF AMOUNT EQUIVALENT TO SLIDE LENGTH |
| | | | VERTICALLY ORIENTED | |
| | | SLIDE OPERATION EXCEEDING HALF OF HORIZONTAL SCREEN WIDTH | HORIZONTALLY ORIENTED | AUTOMATICALLY TURN PAGE IN SLIDING DIRECTION IN UNITS OF AMOUNT EQUIVALENT TO SINGLE SCREEN |
| | | | VERTICALLY ORIENTED | |
| | SLIDE OPERATION ACROSS PLURALITY OF SCREENS | | HORIZONTALLY ORIENTED | AUTOMATICALLY TURN PAGE IN SLIDING DIRECTION IN UNITS OF AMOUNT EQUIVALENT TO NUMBER OF OPERATION SCREENS |
| | | | VERTICALLY ORIENTED | |

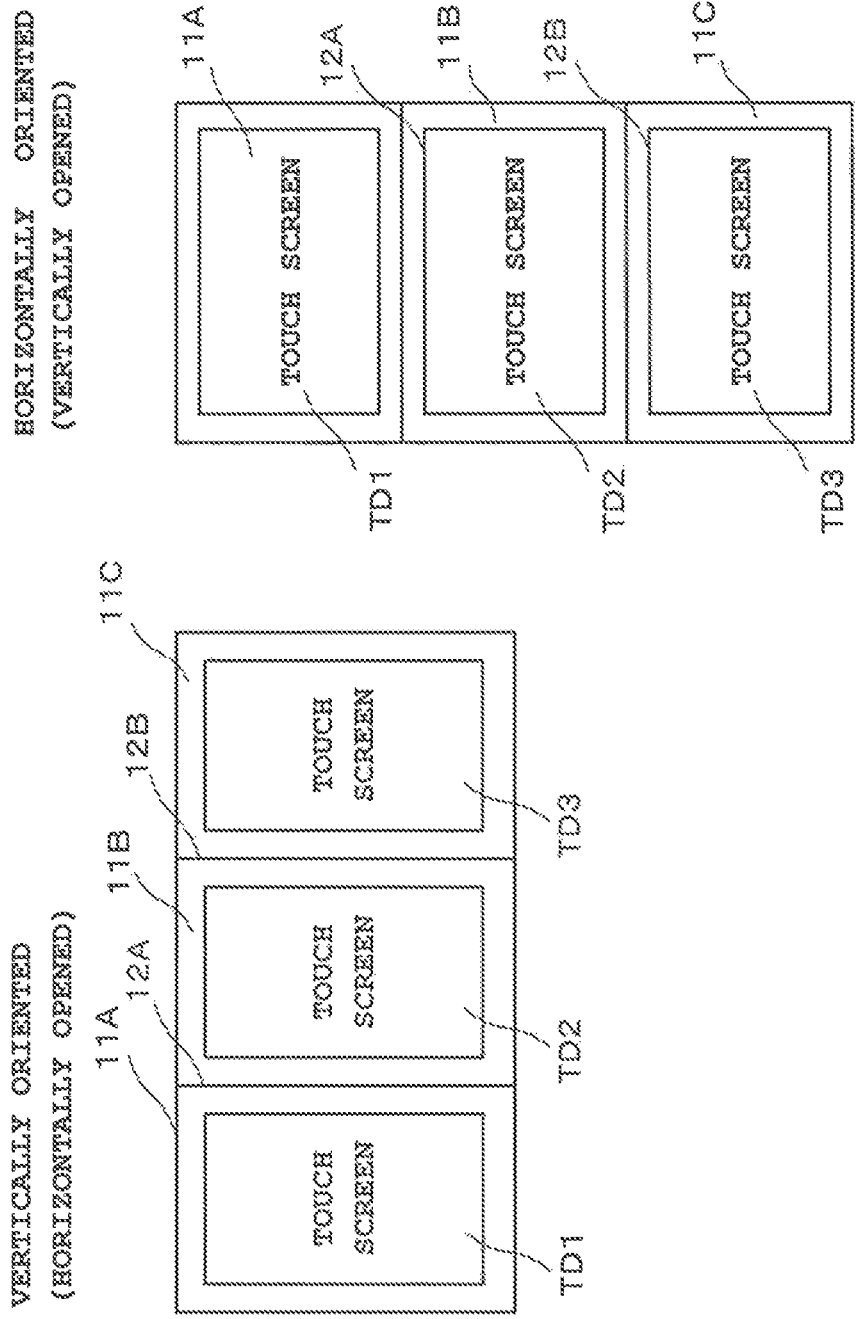

VERTICALLY ORIENTED
(HORIZONTALLY ALIGNED)

HORIZONTALLY ORIENTED
(VERTICALLY ALIGNED)

VERTICALLY ORIENTED
(HORIZONTALLY ALIGNED)

HORIZONTALLY ORIENTED
(VERTICALLY ALIGNED)

TERMINAL DEVICE AND CONTROL PROGRAM THEREOF

CROSS-REFERENCE TO RELATED APPLICATION

This application is based upon and claims the benefit of priority from the prior Japanese Patent Application No. 2010-067234, filed Mar. 24, 2010, the entire contents of which is incorporated herein by reference.

BACKGROUND OF THE INVENTION

1. Field of the Invention

The present invention relates to a terminal device having a plurality of screens and a control program thereof.

2. Description of the Related Art

In recent years, terminal devices such as mobile phones have become increasingly sophisticated, and the increase of screen size through the equipment of a plurality of display sections has been actualized along with it. As a technology for increasing the screen size through the equipment of a plurality of display sections such as this, for example, a terminal device is conventionally known in which the display contents of a plurality screens displaying information such as text and images are switched and displayed in response to a forward scrolling operation or a backward scrolling operation on the screens (refer to, for example, Japanese Patent Application Laid-Open (Kokai) Publication No. 2008-217647).

However, in the above-described conventional technology, there is a problem in that the area of the screen becomes small because various controllers are required for scrolling the screen. Therefore, a technology has been conceived in which a touch screen structured by a transparent touch-panel being layered on the surface of a screen is provided. This technology does not require controllers for scrolling a screen and allows an intuitive operation, wherefore it is now widely used in terminal devices. However, this technology too has problems. Firstly, a scrolling operation is required to be performed for each screen, which is bothersome. Secondly, in a case where information amounting to a plurality of pages is being displayed in a manner that these pages are assigned to a plurality of screens, respectively, if the user performs a scrolling operation on one screen and forgets to perform it on another screen, continuity of the pages is no longer maintained among the screens.

The present invention has been conceived to solve the above-described problems. An object of the present invention is to provide a terminal device actualizing suitable display control of a plurality of screens through simple and intuitive operations.

SUMMARY OF THE INVENTION

In accordance with one aspect of the present invention, there is provided a terminal device having a plurality of screens, comprising: a slide operation detection means for detecting a slide operation performed on each of the plurality of screens; an identification means for, when the slide operation is detected by the slide operation detection means, identifying a screen on which the slide operation has been performed as an operation screen; and a display control means for performing display control corresponding to the slide operation on the plurality of screens including the operation screen identified by the identification means and a screen related to the operation screen.

In accordance with another aspect of the present invention, there is provided a non-transitory computer-readable storage medium having stored thereon a program that is executable by a computer, the program being executable by the computer to perform a process comprising: processing for detecting a slide operation performed on each of a plurality of screens; processing for identifying, when the slide operation is detected, a screen on which the slide operation has been performed as an operation screen; and processing for performing display control corresponding to the slide operation on the plurality of screens including the identified operation screen and a screen related to the operation screen.

According to the present invention, a suitable display control of a plurality of screens through simple and intuitive operations can be actualized, and therefore it is practically useful.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2A and FIG. 2B are outer appearance views of two casings 11A and 11B in an opened state;

FIG. 3A to FIG. 3G are diagrams for explaining display control performed in response to slide operations when a slide operation is performed on two touch screens TD1 and TD2 in a horizontally opened state (vertically held state);

FIG. 5 is a diagram for explaining an operation table TB;

FIG. 6 is a flowchart showing an overview of the overall operations of the terminal device 10 which are initiated when its power is turned ON;

FIG. 7A and FIG. 7B are diagrams of a variation example of the embodiment, in which outer appearance views of three touch screens TD1, TD2, and TD3 in an opened state are shown;

DETAILED DESCRIPTION OF THE PREFERRED EMBODIMENTS

The present invention will hereinafter be described in detail with reference to the preferred embodiments shown in the accompanying drawings.

Figure 1:
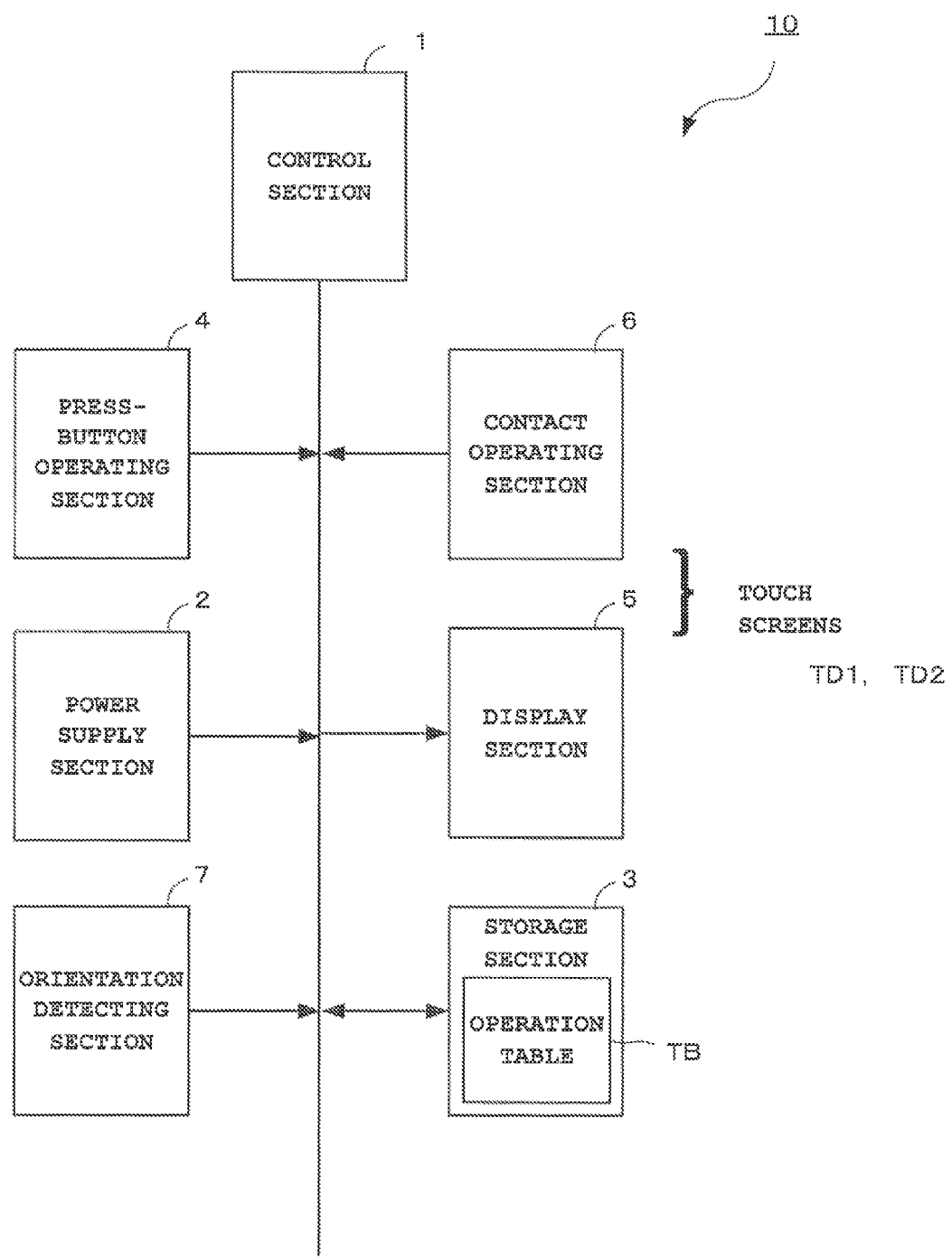
FIG. 1 is a block diagram showing the basic components of a terminal device 10.

FIG. 1 is a block diagram showing the basic components of the terminal device 10.

The terminal device 10 is, for example, a foldable type terminal device (such as a mobile phone) whose two rectangular casings are foldably attached, and has a plurality of screens. A control section 1, which operates by receiving power supply from a power supply section 2 including a secondary battery or the like, controls the overall operations of the terminal device 10 in accordance with various programs in a storage section 3. This control section 1 is provided with a central processing unit (CPU), a memory, and the like (not shown). The storage section 3 is an internal memory such as a read-only memory (ROM) or a random access memory (RAM), and has a program area and a data area (not shown). In the program area of the storage section 3, programs for actualizing the present embodiment based on operation procedures shown in FIG. 6, described hereafter, are stored.

Here, the control section 1 actualizes functions of a slide operation detection means, an identification means, and a display control means.

In the data area of the storage section 3, various flag information, various information required to operate the terminal device 10, and an operation table TB described hereafter are stored. Note that the storage section 3 may be, for example, structured to include a detachable portable memory (recording media) such as a secure digital (SD) card or an integrated circuit (IC) card. Alternatively, the storage section 3 may be structured to be provided on a predetermined external server (not shown). A press-button operating section 4 has various press-button-type keys used to dial a number, enter text, enter a command, and the like, and the control section 1 performs various types of processing based on operation signals sent from this press-button operating section 4.

A display section 5 including high-definition liquid crystal or organic electroluminescent display displays an idling screen, icons, date and time information, text data, etc., and a touch screen is structured by a contact operating section (a transparent contact sensor or a touch panel) 6 that detects finger contact being layered on the surface of this display section 5. In the embodiment, two physically-separated independent display sections 5 are provided, and two independent touch screens TD1 and TD2 are structured by the contact operating section 6 being layered on substantially the entire surface of each display section 5. When a contact operation (touch operation) is performed on the touch screens TD1 and TD2, the contact operating section 6 provides the control section 1 with a detection result of the touch operation. This touch operation may be detected using a capacitance method or a resistive film method. Also, it may be detected using a piezoelectric method that enables the detection of pressing (pressure) by an operating instrument or a finger, in addition to contact. In the embodiment, the capacitance method, which detects human contact, is used.

An orientation detecting section 7 includes, for example, a three-axis acceleration sensor, and detects whether a rectangular terminal casing is oriented to be vertically long (vertically oriented) or horizontally long (horizontally oriented), based on the angle of the terminal casing relative to the direction of gravitational force and vibrations. That is, the orientation detecting section 7 detects whether the overall rectangular terminal casing is in a vertically oriented state where it is oriented to be vertically long or in a horizontally oriented state where it is oriented to be horizontally long, and the control section 1 changes display state so that display contents on the touch screens TD1 and TD2 are displayed in accordance with the orientation of the terminal casing, based on the detection result.

FIG. 2A and FIG. 2B are outer appearance views of two casings 11A and 11B in an opened state.

The two rectangular casings 11A and 11B are foldably (openably and closably) connected by a hinge section 12, and the touch screens TD1 and TD2 of the same shape and size (rectangular) are arranged on substantially the entire area on the inner surface side of the casings 11A and 11B, respectively. FIG. 2A shows a state in which the two rectangular casings 11A and 11B are opened to be horizontally aligned (horizontally opened state), or in other words, a state in which the two rectangular casings 11A and 11B are vertically oriented such that the overall terminal casing is horizontally long. In this vertically oriented state (horizontally opened state), the two touch screens TD1 and TD2 are in a horizontally aligned state (horizontally opened state) near each other (side-by-side). In this instance, as shown in FIG. 2A, an arrangement state is formed in which the touch screen TD1 is positioned on the left side and the touch screen TD2 is positioned on the right side.

FIG. 2B shows a state in which the overall terminal casing is rotated by 90 degrees from the state shown in FIG. 2A, and the two horizontally long casings 11A and 11B are opened to be vertically aligned (vertically opened state), or in other words, a state in which the two rectangular casings 11A and 11B are horizontally oriented such that the overall terminal casing is vertically long. In the horizontally oriented state (vertically opened state), the two touch screens TD1 and TD2 are in a vertically aligned state (vertically opened state) near each other (side-by-side). In this instance, as shown in FIG. 2B, an arrangement state is formed in which the touch screen TD1 is positioned on the upper side and the touch screen TD2 is positioned on the lower side.

FIG. 3A to FIG. 3G are diagrams for explaining display control that are, when a touch operation (slide operation) is performed on the touch screens TD1 and TD2 with display information amounting to a plurality of pages being assigned and displayed in page sequence on the two touch screens TD1 and TD2 in the horizontally opened state (vertically oriented state), performed in response to this slide operation. The display control shown in FIG. 3A to FIG. 3G correspond to some of the stored contents in the operation table TB (described hereafter) that stores various display control performed in response to slide operations performed on the touch screens TD1 and TD2. Although the touch screens TD1 and TD2 are slightly separated from each other as shown in FIG. 2A and FIG. 2B, they are shown adjacent to each other in FIG. 3A to FIG. 3G for simplicity.

FIG. 3A shows display information (text, images, and the like) amounting to a plurality of pages, and the numerals in the drawing indicate the page numbers starting from "1". Here, the slide operation refers to, if it is performed by human contact, an operation in which a finger moves on either of the touch screens TD1 and TD2 while being in contact therewith. This slide operation is differentiated from a touch operation in which a finger simply comes into contact with the touch screens TD1 and TD2. Types of slide operation include a slide operation performed from the touch screen TD1 toward the touch screen TD2 (from left to right in the drawings) (forward scrolling operation), and a slide operation performed from the touch screen TD2 toward the touch screen TD1 (right to left in the drawings) (backward scrolling operation). In addition, there are also a multiple slide operation performed using two fingers simultaneously (multi-touch slide operation) and a single slide operation performed using one finger (single touch slide operation).

When a slide operation performed on at least one of the touch screen TD1 or the touch screen TD2 is detected, the control section 1 identifies the touch screen on which the slide operation has been performed as an operation screen and performs display control corresponding to the sliding operation on the plurality of touch screens (two screens in this embodiment) including the operation screen and a screen related to the operation screen (the adjacent touch screen in this embodiment).

That is, when a slide operation is performed within the area of one of the touch screens TD1 and TD2 on which display information amounting to a plurality of pages are assigned and displayed in page sequence, if the slide length is a predetermined value or less with respect to the length of the touch screen (half of the length of a single screen: half of the horizontal width) (described in detail hereafter with reference to FIG. 3B), the control section 1 performs display control by instructing the touch screens TD1 and TD2 to scroll the display contents by an amount equivalent to the slide length. Alternatively, when a slide operation is performed within the area of a single screen and if the slide length exceeds the above-described predetermined value, the control section 1 performs display control by instructing the touch screens TD1 and TD2 to turn the page by an amount equivalent to one page (described in detail hereafter with reference to FIG. 3C).

Alternatively, when a slide operation is performed across a plurality of touch screens, the control section 1 performs display control by instructing the pages to be turned by an amount equivalent to the number of screens across which the slide operation has been performed (described in detail hereafter with reference to FIG. 3D). When a plurality of slide operations are performed simultaneously (multi-touch operation), display control is repeatedly and continuously performed a number of times corresponding to the number of slide operations at predetermined time intervals (described in detail hereafter with reference to FIG. 3E to FIG. 3G). FIG. 3E to FIG. 3G describe display control performed in this instance. FIG. 3E shows display control performed when the slide length is a predetermined value or less, as in the case of the above-described FIG. 3B, FIG. 3F shows display control performed when the slide length exceeds the predetermined value, as in the case of the above-described FIG. 3C. FIG. 3G shows display control performed when the slide operation is performed across a plurality of screens, as in the case of the above-described FIG. 3D. A multi-touch operation such as this is used, for example, to automatically and sequentially switch and display a plurality of images at five-second intervals when they are displayed in slide-show style, or to automatically and sequentially switch and display text information on each page of an electronic book at a time interval (such as 5 minutes) discretionarily set in advance.

FIG. 4A to FIG. 4G are diagrams for explaining display control performed in the vertically opened state (horizontally oriented state), whereas FIG. 3A to FIG. 3G are diagrams for explaining display control performed in the horizontally opened state (vertically oriented state). That is, FIG. 4A to FIG. 4G are diagrams for explaining display control that are, when a slide operation (slide operation in the up-down direction in the drawings) is performed on the touch screens TD1 and TD2 with display information amounting to a plurality of pages being assigned and displayed in page sequence on the two touch screens TD1 and TD2, performed in response to this slide operation. The display control shown in FIG. 4A to FIG. 4G correspond to some of the stored contents in the operation table TB. Note that, although the display control performed in the vertically opened state (horizontally oriented state) are basically similar to the display control performed in the horizontally opened state (vertically oriented state), operations in the forward direction indicate slide operations from up to down, and operations in the backward direction indicate slide operations from down to up.

Figure 4A:
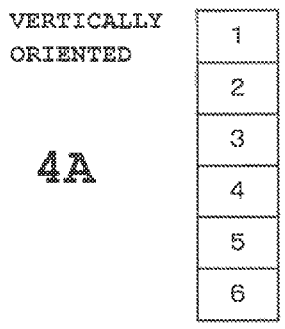
FIG. 4A to FIG. 4G are diagrams for explaining display control performed in response to slide operations when a slide operation is performed on the two touch screens TD1 and TD2 in a vertically opened state (horizontally held state)
Figure 4B:
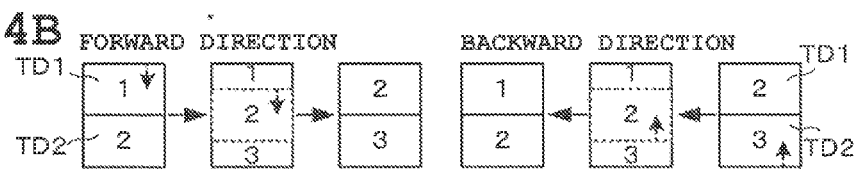
Figure 4C:
Figure 4D:
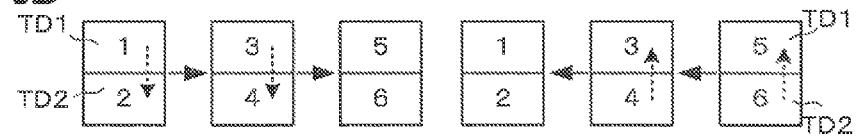
Figure 4E:
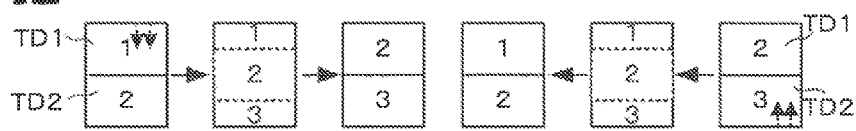
Figure 4F:
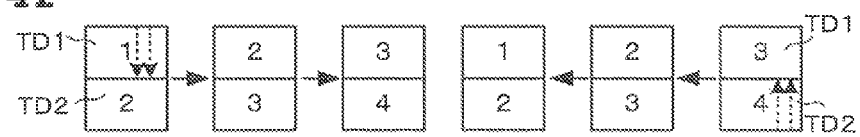
Figure 4G:
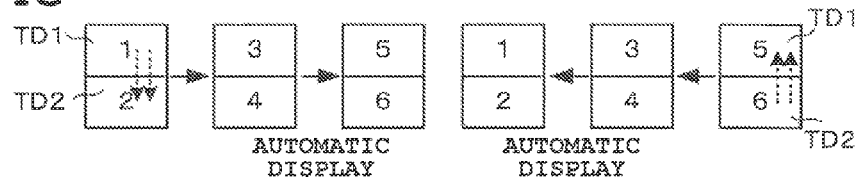

FIG. 4A shows display information (text, images, etc.) amounting to a plurality of pages, as in the case of the above-described FIG. 3A. FIG. 4B is a diagram for explaining display control corresponding to that in the above-described FIG. 3B. As shown in FIG. 4B, when the slide length of a slide operation performed within a single screen is a predetermined value (half of the length of a single screen: half of the vertical width) or less, the display contents are scrolled by an amount equivalent to the slide length. FIG. 4C is a diagram for explaining display control corresponding to that in the above-described FIG. 3C. As shown in FIG. 4C, when the slide length exceeds a predetermined value (half of the vertical width of a single screen), the pages are turned by an amount equivalent to a single page. FIG. 4D is a diagram for explaining display control corresponding to that in the above-described FIG. 3D. As shown in FIG. 4D, when a slide operation is performed across a plurality of screens, the pages are turned by an amount corresponding to the number of screens across which the slide operation is performed. FIG. 4E to FIG. 4G are diagrams for explaining display control corresponding to those in the above-described FIG. 3E to FIG. 3G. As shown in FIG. 4E to FIG. 4G, when a plurality of slide operations are performed simultaneously, display control is repeatedly and continuously performed a number of times corresponding to the number of slide operations at predetermined time intervals.

FIG. 5 is a diagram for explaining the operation table TB. The operation table TB is configured to associate and store "type of operation" indicating the type of performed slide operation, "terminal orientation" indicating the orientation of the terminal device 10 detected by the orientation detecting section 7, and "display control" indicating the details of display control performed in response to a slide operation. "Type of operation" is broadly classified into a single slide operation (slide touch) field and a plurality of simultaneous slide operations (multi-touch) field.

"Single touch" and "multi-touch" are further divided into "operation within single screen" and "slide operation across a plurality of screens". "Operation within single screen" is further divided into "slide operation within half of horizontal screen width" and "slide operation exceeding half of horizontal screen width", and "operation within single screen" under "single touch" further includes "touch operation". Each field under "type of operation" is further divided into "horizontally oriented" and "vertically oriented" under "terminal orientation", and "display control" is stored in association with each of the divided fields. Note that "touch operation" refers to a single-touch operation other than a slide operation, and "display control" corresponding to this touch operation is to stop automatic scrolling and automatic page turning when either of the touch screens TD1 and TD2 is touched. The details of the "display control" are basically similar regardless of whether "terminal orientation" is "horizontally oriented" or "vertically oriented".

Next, the operation concept of the terminal device 10 according to the embodiment will be described with reference to the flowchart shown in FIG. 6. Here, each function described in the flowchart is stored in readable program code format, and operations based on these program codes are sequentially performed. Operations based on the above-described program codes transmitted over a transmission medium such as a network can also be sequentially performed. That is, the unique operations of the embodiment can be performed using program and data supplied from an outside source over a transmission medium, in addition to a recording medium.

Figure 6:
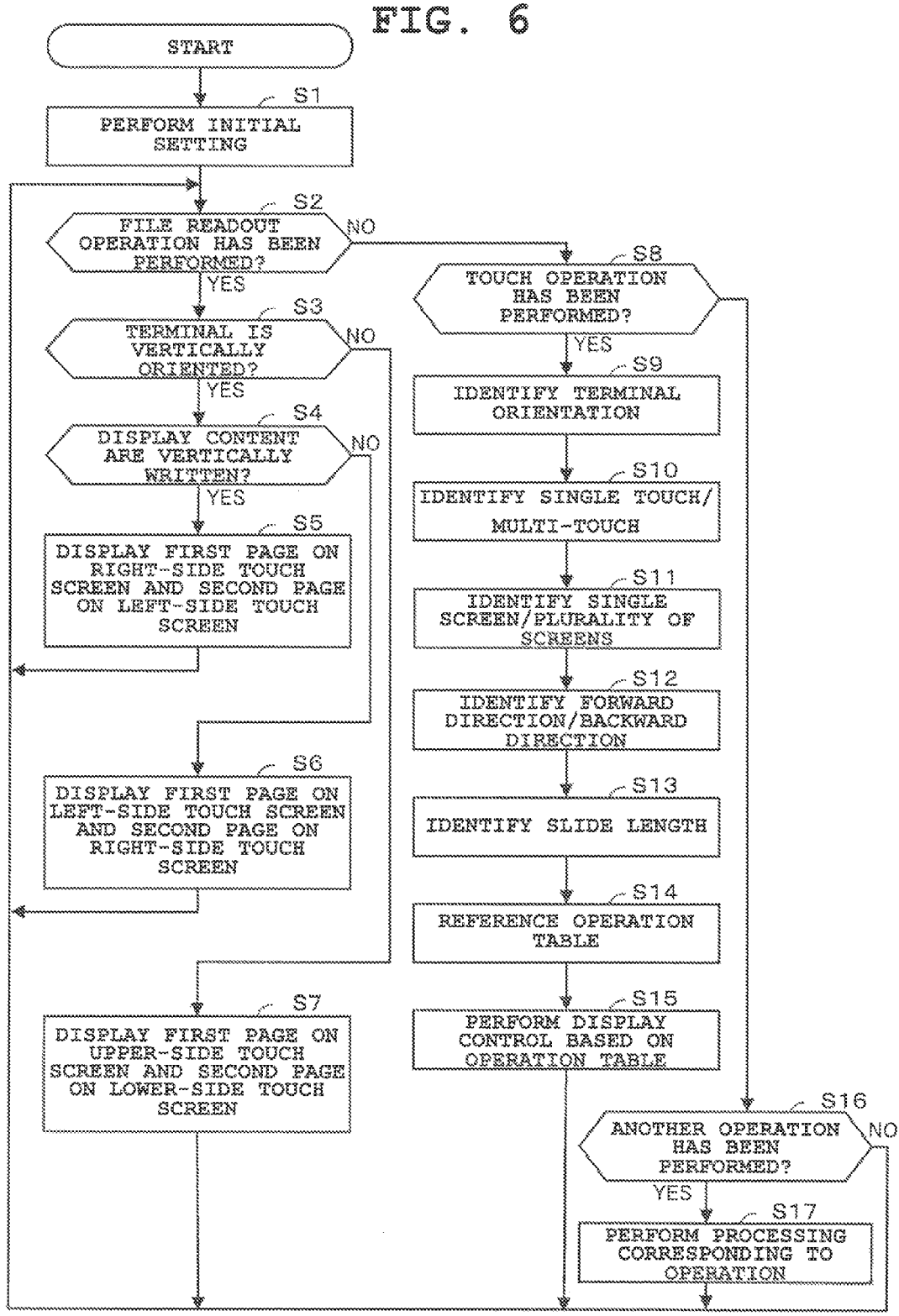

FIG. 6 is a flowchart showing an overview of the overall operations of the terminal device 10 which are initiated when its power is turned ON.

First, the control section 1 performs an initial setting for resetting a memory and the like upon power being turned ON (Step S1), and then judges whether or not a file readout operation for reading out and displaying an image file, a text file, and the like has been performed (Step S2). When judged that a file readout operation has not been performed, the control section 1 judges whether or not a touch operation (including a slide operation) has been performed on the touch screens TD1 and TD2 (Step S8). When judged that a touch operation has not been performed, the control section 1 judges whether or not another operation has been performed (Step S16). When judged that another operation has been performed (YES at Step S16), the control section 1 performs, for example, processing for attaching a mark onto a text file or the like in response to the actuation of a bookmark function, as processing corresponding to the operation (Step S17), and then returns to the above-described Step S2.

At Step S2, when judged that a file readout operation has been performed (YES at Step S2), the control section 1 acquires a detection result from the orientation detecting section 7 and judges whether or not the terminal casing is vertically oriented (Step S3). When judged that the terminal casing is in the vertically oriented state shown in FIG. 2A (YES at Step S3), the control section 1 judges whether or not the display contents are vertically written (Step S4). Here, when judged that the terminal casing is in the vertically oriented state shown in FIG. 2A and the display contents are vertically written from top to bottom (YES at Step S4), the control section 1 performs display control to start writing the display information of a first page from the upper right corner of the touch screen TD2 on the right side and to start writing the display information of a second page from the upper right corner of the touch screen TD1 on the left side (Step S5).

When judged that the terminal casing is in the vertically oriented state shown in FIG. 2A and the display contents are horizontally written from left to right (NO at Step S4), the control section 1 performs display control to start writing the display information of the first page from the upper left corner of the touch screen TD1 on the left side and start writing the display information of the second page from the upper left corner of the touch screen TD2 on the right side (Step S6). Conversely, when judged at Step S3 that the terminal casing is in the horizontally oriented state shown in FIG. 2B (NO at Step S3), the control section 1 performs display control to start writing the display information of the first page from the upper right corner of the touch screen TD1 on the upper side for vertical writing or from the upper left corner of the touch screen TD1 on the upper side for horizontal writing, and start writing the display information of the second page from the upper right corner of the second touch screen TD2 on the lower side for vertical writing or from the upper left corner of the second touch screen TD2 on the lower side for horizontal writing (Step S7). Then, the control section 1 returns to the above-described Step S2.

When judged at Step S8 that a touch operation (including a slide operation) has been performed on the touch screens TD1 and TD2 (YES at Step S8), the control section 1 identifies the orientation of the terminal casing based on a detection result from the orientation detecting section 1 (Step S9). The control section 1 then identifies the type of the touch operation performed on the touch screens TD1 and TD2 as single touch or multi-touch (Step S10) and identifies whether the touch operation is an operation within a single screen or a slide operation across a plurality of screens (Step S11). In addition, the control section 1 identifies whether the slide operation has been performed in the forward direction or the backward direction (Step S12), and then identifies the slide length (Step S13). Next, the control section 1 references the operation table TB based on the orientation of the terminal casing, single touch/multi-touch, single screen/plurality of screens, forward direction/backward direction, and the slide length identified as described above (Step S14), and after performing display control based on the contents of the operation table TB (Step S15), returns to the above-described Step S2.

Next, display control (Step S15) based on the contents of the operation table TB will be described in detail with reference to the specific examples in FIG. 3A to FIG. 3G. Here, the display control stored in the operation table TB is basically similar regardless of whether the terminal casing is horizontally oriented or vertically oriented. Therefore, display control in the horizontally opened state (vertically oriented state) will be described, and descriptions of display control in the vertically opened state (horizontally oriented state) will be omitted.

First, as shown in FIG. 3B, an instance will be described in which a slide operation is performed from the left end within the area of the touch screen TD1 toward the right (forward scrolling operation by single touch), with the information of the first page being displayed on the touch screen TD1 and the information of the second page being displayed on the touch screen TD2. In this instance, the touch screen TD1 is identified as a screen on which a slide operation has been performed (operation screen), and the touch screen TD2 is identified as a screen related to the operation screen (adjacent screen). Display control is performed on a plurality of screens including this operation screen and the related screen.

When a slide operation in the forward direction is performed within the area of the touch screen TD1 by single touch, the display content is scrolled by an amount equivalent to the slide length if the slide length (length of the dashed arrow in FIG. 3B) is a predetermined value or less, or in other words, half of the horizontal width of the touch screen TD1 or less. As a result, the display contents on the touch screens TD1 and TD2 are scrolled in the leftward direction and displayed. That is, when a slide operation is performed on the left-half area of the touch screen TD1 and the slide length is half of the horizontal width of the touch screen TD1, the display contents is scrolled by an amount equivalent to the slide length (the display contents are scrolled in the forward direction). As a result, information in the latter-half portion of the first page is scrolled to be displayed in the left-half area of the touch screen TD1 and information in the first-half portion of the second page is displayed in the right-half area. In addition, information in the latter-half portion of the second page is displayed in the left-half area of the touch screen TD2 and information in the first-half portion of the third page is newly displayed in the right-half area.

Next, in this state, when a slide operation toward the rightward direction is performed in the right-half area of the touch screen TD1 (forward scrolling operation by single touch), or in other words, when a slide operation similar to the above-described first slide operation is performed, the display contents on the touch screens TD1 and TD2 are scrolled in the leftward direction by an amount equivalent to the slide length and displayed, in response to this second slide operation. As a result of this second slide operation, all of the information of the second page is displayed in the entire area of the touch screen TD1 and all of the information of the third page is displayed in the entire area of the touch screen TD2, as shown in FIG. 3B.

In the example shown in FIG. 3B, when performing a forward scrolling operation, the user performs the scrolling operation with the touch screen TD1 as a touch-start position. However, a configuration may be applied in which a scrolling operation is performed from the touch screen TD2, and this configuration may be configured such that display contents on the touch screen TD1 (information of the first page) remains unchanged at its current page and, if the touch screen TD2 is the final screen of a plurality of screens (last screen), only display contents on the touch screen TD2 changes from the second page to the third page. Alternatively, the configuration may be configured such that the touch screen TD1 and the touch screen TD2 are cyclically continuous. That is, it may be configured such that, when display contents on the touch screen TD2 changes, for example, from the second page to the third page, display contents on the touch screen TD1 also changes from the first page to the fourth page (the same applies hereafter).

In the above-described example, display control is described that is performed when a forward scrolling operation by single touch is performed. However, a basically similar display control is performed when a backward scrolling operation is performed by single touch. When a slide operation is performed within the area of the touch screen TD2, the touch screen TD2 is identified as a screen on which a slide operation has been performed (operation screen) and the touch screen TD1 is identified as a screen related to the operation screen (adjacent screen). Then, display control is performed on a plurality of screens including this operation screen and the related screen. As shown in FIG. 3B, when a slide operation from the right end of the touch screen TD2 toward the leftward direction is performed (backward scrolling operation by single touch) with the information of the second page being displayed on the touch screen TD1 and the information of the third page being displayed on the touch screen TD2, the display contents are scrolled by an amount equivalent to the slide length if the slide length is half of the horizontal width of the touch screen TD2 or less (the display contents are scrolled in the backward direction). As a result, the display contents on the touch screens TD1 and TD2 are scrolled in the rightward direction and displayed.

As shown in FIG. 3B, when a slide operation is performed in the right-half area of the touch screen TD2 and the slide length is half of the horizontal width of the touch screen TD2, information in the first-half portion of the third page remains displayed in the right-half area of the touch screen TD2, and information in the latter-half portion of the second page is displayed in the left-half area. In addition, information in the first-half portion of the second page is displayed in the right-half area of the touch screen TD1 and information in the latter-half portion of the first page is newly displayed in the left-half area. Next, in this state, when a slide operation toward the leftward direction is performed in the left-half area of the touch screen TD2 (backward scrolling operation by single touch), the display contents on the touch screens TD1 and TD2 are scrolled in the rightward direction by an amount equivalent to the slide length. As a result, all of the information of the second page is displayed in the entire area of the touch screen TD2 and all of the information of the first page is displayed in the entire area of the touch screen TD1, as shown in FIG. 3B.

As shown in FIG. 3C, when a slide operation from the left end of the touch screen TD1 toward the rightward direction is performed (forward scrolling operation by single touch) with the information of the first page being displayed on the touch screen TD1 and the information of the second page being displayed on the touch screen TD2, display control is performed that generates an instruction to perform page turning by an amount equivalent to a single screen (page turning in the forward direction) if the slide length exceeds a predetermined value (half of the horizontal width of a single screen). As a result, all of the information of the second page is displayed in the entire area of the touch screen TD1 and all of the information of the third page is displayed in the entire area of the touch screen TD2.

Then, when a slide operation similar to the first slide operation (forward scrolling operation) is performed in this state, page turning is performed by an amount equivalent to a single screen, by this second slide operation as well. As a result, all of the information of the third page is displayed in the entire area of the touch screen TD1 and all of the information of the fourth page is displayed in the entire area of the touch screen TD2. In the example shown in FIG. 3C, when performing a forward scrolling operation, the user performs the scrolling operation with the touch screen TD1 as a touch-start position. However, a configuration may be applied in which a scrolling operation is performed from the touch screen TD2. Furthermore, even when a backward scrolling operation by single touch is performed, display control that is basically similar to that described above is performed. That is, when the slide length exceeds half of the horizontal width of a single screen, display control is performed that generates an instruction to perform page turning by an amount equivalent to a single screen. As a result, the contents of each touch screen TD1 and TD2 are scrolled (page turning in the backward direction) by one page, as shown in FIG. 3C.

As shown in FIG. 3D, when a slide operation is performed across the touch screens TD1 and TD2 (forward scrolling operation by single touch) with the information of the first page being displayed on the touch screen TD1 and the information of the second page being displayed on the touch screen TD2, display control is performed that generates an instruction to perform page turning by a number of pages (two pages) equivalent to the number of screens (two screens) on which the slide operation has been performed (page turning in the forward direction). As a result, the information of the third page is displayed on the touch screen TD1, and the information of the fourth page is displayed on the touch screen TD2. Note that, when a slide operation is performed across the touch screens TD1 and TD2 as described above, both of the touch screens TD1 and TD2 are identified as operation screens, and therefore there is no related screen (adjacent screens). Accordingly, display control is performed on these plurality of operation screens (the same applies hereafter).

Then, in this state, when a slide operation similar to the first slide operation performed across the two touch screens TD1 and TD2 is performed, page turning is performed by a number of pages (two pages) equivalent to the number of screens (two screens), by this second slide operation (forward scrolling operation by single touch) as well. As a result, the information of the fifth page is displayed on the touch screen TD1, and the information of the sixth page is displayed on the touch screen TD2. Even when a backward scrolling operation by single touch is performed across the two touch screens TD1 and TD2A, display control that is basically similar to that described above is performed. That is, display control is performed that generates an instruction to perform page turning by a number of pages equivalent to the number of touch screens (page turning in the backward direction). As a result, the contents of each touch screen TD1 and TD2 are scrolled by a plurality of numbers of pages corresponding to the number of screens, as shown in FIG. 3D.

FIG. 3E to FIG. 3G show the contents of the screens when a plurality of slide operations are performed simultaneously using two fingers (multi-touch slide operation). The display control shown in FIG. 3E to FIG. 3G correspond to the display control shown in FIG. 3B to FIG. 3D. However, here, display control performed for each slide operation as shown in FIG. 3B to FIG. 3D is not performed. In these display control, when a first display control is performed, a second display control is automatically performed after the elapse of a predetermined amount of time. This predetermined amount of time is, for example, five seconds when the display information is images, and five minutes when the display information is text. FIG. 3E describes display control performed when a plurality of slide operations (multi-touch operation) are performed and the slide length is a predetermined value (half of the horizontal width of a single screen) or less. In this instance, when display contents are scrolled in a manner similar to that of when the first slide operation is performed in the above-described FIG. 3B, automatic page turning is performed after the elapse of a predetermined amount of time. As a result, the same contents as that of when the second slide operation is performed in the above-described FIG. 3B are displayed. Note that a similar display control is also performed when a backward scrolling operation is performed, in addition to when a forward scrolling operation is performed.

FIG. 3F describes display control performed when a plurality of slide operations (multi-touch operation) are performed and the slide length exceeds a predetermined value (half of the horizontal width of a single screen). In this instance, when page turning is performed in a manner similar to that of when the first slide operation is performed in the above-described FIG. 3C, automatic page turning is performed after the elapse of a predetermined amount of time. As a result, the same contents as that of when the second slide operation is performed in the above-described FIG. 3C are displayed. Note that a similar display control is also performed when a backward scrolling operation is performed, in addition to when a forwarding operation is performed. FIG. 3G describes display control performed when a plurality of slide operations (multi-touch operation) are performed across the touch screens TD1 and TD2. In this instance, when page turning is performed in a manner similar to that of when the first slide operation is performed in the above-described FIG. 3D, automatic page turning is performed after the elapse of a predetermined amount of time.

As a result, the same contents as that of when the second slide operation is performed in the above-described FIG. 3D are displayed. Note that a similar display control is also performed when a backward scrolling operation is performed, in addition to when a forwarding operation is performed.

In the examples shown in FIG. 3E to FIG. 3G, slide lengths in a multi-touch operation are the same. When these slide lengths differ, such as when one slide length is a predetermined value or less and the other slide length exceeds the predetermined value, display control giving priority to the longer slide length may be performed. Similarly, when one slide length is within a single screen and the other slide length is across a plurality of screens, display control giving priority to the longer slide length, by which automatic page turning is performed, may be performed or, conversely, display control giving priority to the shorter slide length may be performed.

In FIG. 3E to FIG. 3G, examples are described in which a plurality of slide operations are performed using two fingers simultaneously (multi-touch slide operation). However, the number of fingers simultaneously used to perform slide operations may be three or more. In this instance, the predetermined amount of time for automatically performing a second and later display control may be changed depending on the number of fingers used for the operation. For example, in a case where three fingers are used, the predetermined amount of time may be changed to seven seconds when the display information is images and to seven minutes when the display information is text.

As described above, in the embodiment, when a slide operation performed on at least one of the touch screens TD1 and TD2 is detected, the control section 1 identifies the touch screen on which the slide operation has been performed as a operation screen, and performs display control based on the slide operation on the touch screens including the operation screen and a touch screen related to the operation screen (such as an adjacent screen). Accordingly, a suitable display control of a plurality of touch screens can be actualized through simple and intuitive operations, and therefore it is practically useful.

Also, the control section 1 performs different display control depending on whether the slide operation has been performed within a single touch screen or across a plurality of touch screens. Therefore, display control can be changed by merely making a little difference in operation, whereby various display control can be applied.

In addition, when a slide operation is performed across a plurality of touch screens on which display information amounting to a plurality of pages has been assigned and displayed in page sequence, the control section 1 performs page turning corresponding to the number of touch screens on which the slide operation has been performed, as display control corresponding to the slide operation. Therefore, the number of pages to be turned can be changed by merely making a little and natural difference in operation. In this instance, in a case where the number of screens and the number of pages are associated with each other and made equal, the pages can be turned by two pages when a slide operation is performed across two screens. Therefore, intuitive and easy page turning is actualized, and the operability of the device can be significantly improved.

Moreover, when a slide operation is performed with display information amounting to a plurality of pages being assigned and displayed in page sequence on the touch screens, the control section 1 sequentially performs page turning on all the display information on the touch screens, as display control corresponding to the slide operation. Therefore, page turning by an amount equivalent to a plurality of touch screens can be collectively performed by a single slide operation, without a page turning operation for each touch screen being performed. Accordingly, the operability of the device can be significantly improved, and the continuity of pages between each screen can be ensured.

Furthermore, when page turning is performed in response to a slide operation, the control section 1 performs page turning in the direction in which the slide operation has been performed. As a result, the sliding direction and the page turning direction correspond with each other. Therefore, intuitive and easy page turning can be actualized, and the operability of the device can be significantly improved.

Still further, when a plurality of slide operations are simultaneously performed, the control section 1 repeatedly and continuously performs display control by a number of times corresponding to the number of the operations at predetermined time intervals. Therefore, automatic page turning can be performed by merely making a little and natural difference in operation. That is, the control of a plurality of touch screens can be automatically performed by a single slide operation, and the operability of the device can be further significantly improved thereby.

Yet still further, when a slide operation is performed with display information amounting to a plurality of pages being assigned and displayed on a plurality of touch screens in page sequence, the control section 1 performs display control for scrolling display information on all the touch screens. Therefore, the display contents of a plurality of touch screens can be collectively scrolled with a single slide operation. Accordingly, the operability of the device can be significantly improved, and the continuity of pages between each screen can be ensured.

Yet still further, when a slide operation is performed within an area of a single touch screen, the control section 1 generates an instruction to scroll the display content by an amount equivalent to the slide length if the slide length is a predetermined value or less with respect to the length of the screen, or to perform page turning by an amount equivalent to a single screen if the slide length exceeds the predetermined value. Accordingly, the scrolling of display content and page turning can be performed separately depending on the slide length which is a little and natural difference made in operation, whereby intuitive and easy display control can be actualized.

Yet still further, the touch screens TD1 and TD2 are constituted by a plurality of independent display sections 5. Therefore, regardless of whether or not the display sections 5 are far from each other in terms of distance, display control corresponding to a slide operation can be performed on the touch screens which include a screen related to the screen on which the slide operation has been performed.

In the above-described embodiment, an example is described in which the two touch screens TD1 and TD2 are arranged as its plurality of screens. However, the number of touch screens may be three or more, and the way these touch screens are arranged may be determined discretionarily. For example, FIG. 7A and FIG. 7B show an example in which three touch screens TD1, TD2, and TD3 are aligned side-by-side. Three rectangular casings 11A, 11B, and 11C are foldably (openably and closably) connected by hinge sections 12A and 12B, and the touch screens TD1, TD2, and TD3 of the same shape and size (rectangular) are arranged on substantially the entire area on the inner surface side of the casings 11A, 11B, and 11C, respectively.

FIG. 7A shows a state in which the three rectangular casings 11A, 11B, and 11C are opened to be horizontally aligned (horizontally opened state), or in other words, a state in which the three rectangular casings 11A, 11B, and 11C are vertically oriented such that the overall terminal casing is horizontally long. In this vertically oriented state (horizontally opened state), the three touch screens TD1, TD2, and TD3 are in a horizontally aligned state (horizontally opened state) near each other (side-by-side). In this instance, as shown in FIG. 7A, an arrangement state is formed in which the touch screen TD1 is positioned on the left side, the touch screen TD2 is positioned in the center, and the touch screen TD3 is positioned on the right side.

FIG. 7B shows a state in which the overall terminal casing is rotated by 90 degrees from the state shown in FIG. 7A, and the three horizontally long casings 11A, 11B, and 11C are opened to be vertically aligned (vertically opened state), or in other words, a state in which the three horizontally long casings 11A, 11B, and 11C are horizontally oriented such that the overall terminal casing is vertically long. In the horizontally oriented state (vertically opened state), the three touch screens TD1, TD2, and TD3 are in a vertically aligned state (vertically opened state) near each other (side-by-side). In this instance, as shown in FIG. 7B, an arrangement state is formed in which the touch screen TD1 is positioned on the upper side, the touch screen TD2 is positioned in the center, and the touch screen TD3 is positioned on the lower side.

Figure 8A:
FIG. 8A to FIG. 8D are diagrams for explaining display control that are, when a slide operation is performed on the three touch screens TD1, TD2, and TD3 in a horizontally opened state (vertically held state), performed in response to this slide operation.

As in the case of the above-described FIG. 3A to FIG. 3G, FIG. 8A to FIG. 8D are diagrams for explaining display control performed in response to a slide operation when this slide operation is performed on the touch screens TD1, TD2, and TD3 with display information amounting to a plurality of pages being assigned and displayed in page sequence on the three touch screens TD1, TD2, and TD3 in the horizontally opened state (vertically oriented state), or in other words, with the information of a first page being displayed on the touch screen TD1, the information of the second page being displayed on the touch screen TD2, and the information of the third page being displayed on the touch screen TD3. As in the case of the above-described FIG. 3B, FIG. 8A shows display control performed when a forward scrolling operation (slide operation) by single touch is performed within the area of the touch screen TD1 and the slide length is a predetermined value or less with respect to the length of the touch screen (half of the length of a single screen: half of the horizontal width). In this instance, the display content is scrolled by an amount equivalent to the slide length. Then, in this state, when a forward scrolling operation by single touch is performed in the right-half area of the touch screen TD1, the information of the second page is displayed on the touch screen TD1, the information of the third page is displayed on the touch screen TD2, and the information of the fourth page is displayed on the touch screen TD3, as shown in FIG. 8A.

Figure 8B:
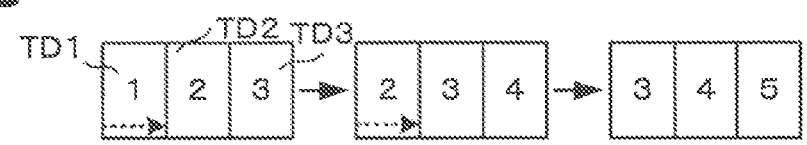

As in the case of the above-described FIG. 3C, FIG. 8B shows display control performed when a forward scrolling operation by single touch is performed within the area of the touch screen TD1 and the slide length exceeds a predetermined value with respect to the length of the touch screen. In this instance, page turning by an amount equivalent to a single screen is performed. As a result, the information of the second page is displayed on the touch screen TD1, the information of the third page is displayed on the touch screen TD2, and the information of the fourth page is displayed on the touch screen TD3, as shown in FIG. 8B. Then, in this state, when a slide operation similar to the first slide operation is performed on the touch screen TD1, the information of the third page is displayed on the touch screen TD1, the information of the fourth page is displayed on the touch screen TD2, and the information of a fifth page is displayed on the touch screen TD3, as a result of this second slide operation, as shown in FIG. 8B.

Figure 8C:
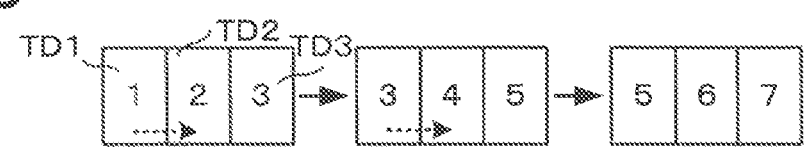

As in the case of FIG. 3D, FIG. 8C shows display control performed when a forward scrolling operation by single touch, which is a slide operation performed across two touch screens TD 1 and TD2, is performed. In this instance, page turning by a number of pages (two pages) equivalent to the number of screens on which the slide operation has been performed (two screens) is performed. As a result, the information of the third page is displayed on the touch screen TD1, the information of the fourth page is displayed on the touch screen TD2, and the information of the fifth page is displayed on the touch screen TD3. Then, in this state, when a slide operation similar to the first slide operation is performed on the touch screens TD1 and TD2, page turning by a number of pages (two pages) equivalent to the number of screens on which the slide operation has been performed (two screens) is performed, by this second slide operation as well. As a result, the information of the fifth page is displayed on the touch screen TD1, the information of the sixth page is displayed on the touch screen TD2, and the information of the seventh page is displayed on the touch screen TD3, as shown in FIG. 8C.

Figure 8D:
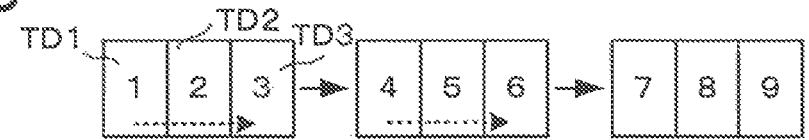

FIG. 8D shows display control performed when a forward scrolling operation by single touch, which is a slide operation performed across three touch screens TD 1, TD2, and TD3, is performed. In this instance, page turning by a number of pages (three pages) equivalent to the number of screens on which the slide operation has been performed (three screens) is performed. As a result, the information of the fourth page is displayed on the touch screen TD1, the information of the fifth page is displayed on the touch screen TD2, and the information of the sixth page is displayed on the touch screen TD3. Then, in this state, when a slide operation similar to the first slide operation is performed on the touch screens TD1, TD2, and TD3, page turning by a number of pages (three pages) equivalent to the number of screens on which the slide operation has been performed (three screens) is performed, by this second slide operation as well. As a result, the information of the seventh page is displayed on the touch screen TD1, the information of an eighth page is displayed on the touch screen TD2, and the information of the ninth page is displayed on the touch screen TD3, as shown in FIG. 8C.

Note that, although FIG. 8A to FIG. 8D show display control that are performed when slide operations in the forward direction are performed, a basically similar display control is performed even when a slide operation in the backward direction is performed. Also note that FIG. 8A to FIG. 8D show display control that correspond to slide operations performed in the horizontally opened state (vertically oriented state), and display control that correspond to slide operations performed in the vertically opened state (horizontally oriented state) are basically similar thereto, wherefore descriptions thereof are omitted. As just described, similar effects as those achieved when two touch screens TD1 and TD2 are arranged can be achieved when the three touch screens TD1, TD2, and TD3 are arranged as described above.

Figure 9A:
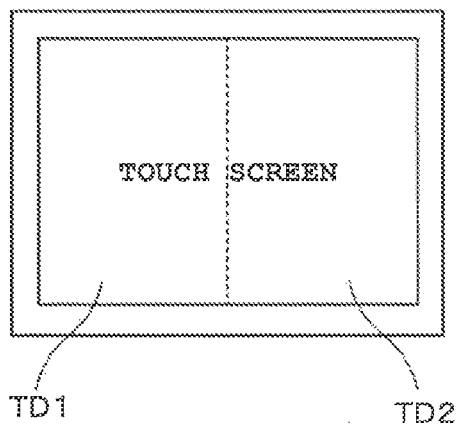
FIG. 9A to FIG. 9D are diagrams of a variation example of the embodiment, in which a single display section 5 has been divided to constitute a plurality of touch screens.
Figure 9B:
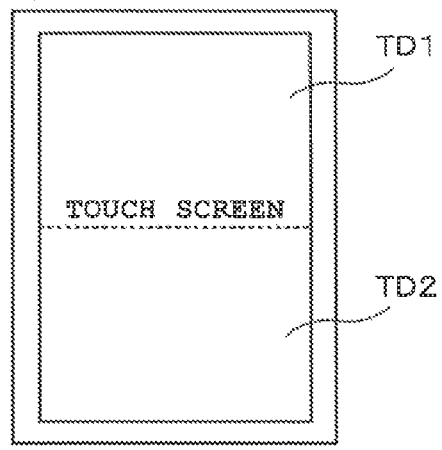
Figure 9C:
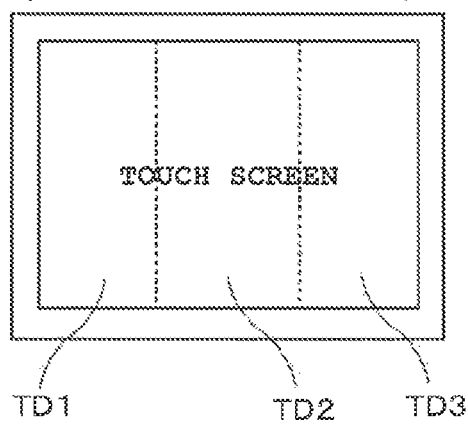
Figure 9D:
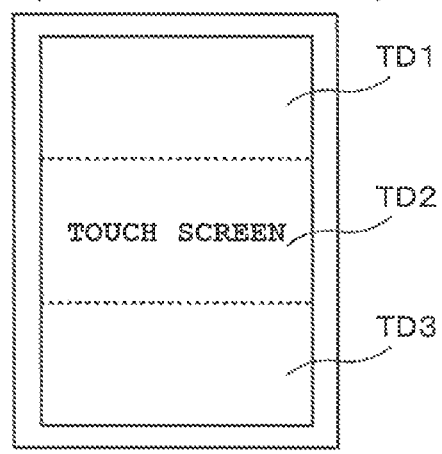

In the above-described embodiment, the touch screens TD1 and TD2 are constituted by a plurality of independent display sections 5. However, these touch screens TD1 and TD2 may be structured by a single display section 5 being divided. FIG. 9A to FIG. 9D show an example where the terminal device 10 is a straight-type terminal device constituted by a single rectangular casing, in which a single display section 5 is provided on substantially the entire area of the casing. In the example, a plurality of touch screens (two or three screens) are configured by the single display section 5 being logically divided (using software). FIG. 9A and FIG. 9B show examples in which the single display section 5 is equally divided into two sections to constitute the touch screens TD1 and TD2, and FIG. 9C and FIG. 9D show examples in which the single display section 5 is equally divided into three sections to constitute the touch screens TD1, TD2, and TD3.

FIG. 9A shows a state in which the overall casing is horizontally long (vertically oriented), or in other words, a state when the two touch screens TD1 and TD2 are horizontally aligned. In this instance, the touch screen TD1 is positioned on the left side and the touch screen TD2 is positioned on the right side. FIG. 9B shows a state in which the overall casing is vertically long (horizontally oriented), or in other words, a state when the two touch screens TD1 and TD2 are vertically aligned. In this instance, the touch screen TD1 is positioned on the upper side, and the touch screen TD2 is positioned on the lower side. FIG. 9C shows a state in which the overall casing is horizontally long (vertically oriented), or in other words, a state when the three touch screens TD1, TD2, and TD3 are horizontally aligned. In this instance, the touch screen TD1 is positioned on the left side, the touch screen TD2 is positioned in the center, and the touch screen TD3 is positioned on the right side. FIG. 9D shows a state in which the overall casing is vertically long (horizontally oriented), or in other words, a state when the three touch screens TD1, TD2, and TD3 are vertically aligned. In this instance, the touch screen TD1 is positioned on the upper side, the touch screen TD2 is positioned in the center, and the touch screen TD3 is positioned on the lower side.

Since these plurality of touch screens are configured by the single display section 5 being logically divided as described above, display control corresponding to a slide operation can be performed on all the touch screens including a screen related to a screen on which a slide operation has been performed, even when each screen displays information independently.

In the above-described embodiment, an example is described in which a plurality of touch screens are arranged in an alignment. However, the arrangement is not limited thereto. The arrangement may be discretionarily determined, as described above. For example, the touch screens may be aligned in two rows or aligned in matrix form. In addition, the number of the touch screens may be four screens or more.

Moreover, in the above-described embodiment, when a slide operation is performed, page turning or display content scrolling is performed in the sliding direction. However, page turning and display content scrolling may be performed in the direction opposite to the sliding direction. In addition, display control corresponding to the slide operation is not limited thereto, and may be the deletion of display information, etc.

Furthermore, in the above-described embodiment, slide operations are performed on a touch screen structured by a contact operating section (transparent touch sensor or touch panel) being layered over the display section 5. However, this slide operation performed on the screen is not limited to contact operation and may be non-contact operation. In this instance, if a non-contact sensor that detects the movement of an object present at a close distance by capacitance and the like is provided near the display section, the user is only required to move a finger in the space above the display section, whereby display control corresponding to a slide operation performed in the air becomes possible. This can be applied not only when a slide operation is performed on the display section, but also when the display section and the operating section are arranged far from each other in terms of distance.

Still further, the terminal device 10 is not limited to a foldable type or a straight type, and may have an arbitrary casing structure such as a rotatable type. In addition, the terminal device 10 is not limited to a mobile phone, and may be a personal computer, a personal digital assistant (PDA), a digital camera, a music player, etc.

In addition, the "devices" or the "units" described in the above-described embodiments are not required to be in a single casing, and may be separated into a plurality of casings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A terminal device having a plurality of screens, comprising:
    a slide operation detection means for detecting a slide operation performed on each of the plurality of screens, the slide operation being a user gesture comprising a sliding motion moving from one position to other position on at least a single one of the screens,
    the slide operation including
    i) a single finger sliding motion operation along a first direction with a first slide length, the single finger sliding motion being designated as a single touch operation, and
    ii) a two-finger simultaneously sliding motion operation along the first direction with the first slide length, the two-finger simultaneously sliding motion being designated as a multi-touch operation;

an identification means for, when the slide operation is detected by the slide operation detection means, identifying a screen on which the slide operation has been detected, the identified screen being designated as an operation screen, wherein the identification means further identifies i) when the slide operation is the single touch operation, and ii) when the slide operation is the multi-touch operation; and a display control means for performing display control, corresponding to the identified slide operation, on the plurality of screens including i) on the operation screen identified by the identification means, and ii) on a screen related to the operation screen, the display control comprising a manipulation of displayed content or data, wherein i) the display control is performed only one time when the identified slide operation is the single touch operation, and ii) the display control is automatically performed repeatedly and continuously at predetermined time intervals when the identified slide operation is the multi-touch operation, wherein, i) the single finger sliding motion operation comprises a plurality of operations along the first direction with different respective first slide lengths, in a first of the plural operations the first direction is horizontally oriented over one or more of the screens and in a second of the plural operations the first direction is vertically oriented over one or more of the screens, ii) a two-finger simultaneously sliding motion operation comprises a plurality of corresponding two-finger simultaneously sliding operations along the first direction with different respective first slide lengths, in a first of the plural operations the first direction is horizontally oriented over one or more of the screens and in a second of the plural operations the first direction is vertically oriented over one or more of the screens, the identification means further identifies i) when the slide operation is the single touch operation limited to one screen, ii) when the slide operation is the single touch operation over plural screens, iii) when the slide operation is the multi-touch operation limited to one screen, and iv) when the slide operation is the multi-touch operation over plural screens; and the display control means performs different respective display controls, corresponding to the identified slide operation including:

i) first display controls when the slide operation is the single touch operation limited to one screen and when the slide operation is the corresponding multi-touch operation limited to one screen, the first display controls being performed only one time when the identified slide operation is the single touch operation, and the first display controls being automatically performed repeatedly and continuously at predetermined time intervals when the identified slide operation is the corresponding multi-touch operation, and ii) second display controls when the slide operation is the single touch operation over plural screens and when the slide operation is the corresponding multi-touch operation over plural screens, the second display controls being performed only one time when the identified slide operation is the single touch operation, and the second display controls being automatically performed repeatedly and continuously at predetermined time intervals when the identified slide operation is the corresponding multi-touch operation.

2. The terminal device according to claim 1, wherein, when the slide operation is performed across a plurality of screens with information amounting to a plurality of pages being assigned and displayed in page sequence on the plurality of screens including the operation screen identified by the identification means and the related screen related to the operation screen, the display control means generates, as the display control corresponding to the slide operation, an instruction to perform page turning by a same number of pages as the number of screens on which the slide operation has been performed.

3. The terminal device according to claim 1, wherein the display control means sequentially performs page turning on display information on the plurality of screens as display control corresponding to the slide operation, with the display information amounting to a plurality of pages being assigned and displayed in page sequence on the plurality of screens including the operation screen identified by the identification means and the related screen related to the operation screen.

4. The terminal device according to claim 3, wherein the slide operation detection means further detects, in addition to detecting the slide operation performed on each screen, a sliding direction of the slide operation; and the display control means generates an instruction to perform page turning in the sliding direction detected by the slide operation detection means when performing the display control to perform page turning in response to the slide operation.

5. The terminal device according to claim 1, wherein the display control means performs the display control to scroll display information on the plurality of screens in page sequence, with the display information amounting to a plurality of pages being assigned and displayed in page sequence on the plurality of screens including the operation screen identified by the identification means and the related screen related to the operation screen.

6. The terminal device according to claim 5, wherein the display control means generates an instruction to scroll the display information by an amount equivalent to a slide length when the slide operation is performed within an area of a single screen and the slide length is a predetermined value or less with respect to a length of the screen, or generates an instruction to perform page turning by an amount equivalent to a single screen when the slide length exceeds the predetermined value.

7. The terminal device according to claim 1, wherein the plurality of screens are constituted by a plurality of independent display sections.

8. The terminal device according to claim 1, wherein the plurality of screens are configured by a single display section being divided into a plurality of screens.

9. The terminal device according to claim 1, wherein,
the plurality of screens are touch screens structured by a touch panel being arranged on each screen; and
the slide operation detection means detects a slide operation performed on each of the plurality of touch screens.

10. A non-transitory computer-readable storage medium having stored thereon a program that is executable by a computer, the program being executable by the computer to perform a process comprising:

slide operation detection processing for detecting a slide operation, which is a gesture comprising a sliding motion moving from one position to another position, performed on each of a plurality of screens;

identification processing for identifying, when the slide operation is detected, a screen on which the slide operation has been performed as an operation screen; and display control processing for performing display control, which comprises a manipulation of displayed content or data, corresponding to the slide operation on the plurality of screens including the identified operation screen and a screen related to the operation screen, wherein the slide operation being a user gesture comprising a sliding motion moving from one position to other position on at least a single one of the screens, the slide operation including i) a single finger sliding motion operation along a first direction with a first slide length, the single finger sliding motion being designated as a single touch operation, ii) a two-finger simultaneously sliding motion operation along the first direction with the first slide length, the two-finger simultaneously sliding motion being designated as a multi-touch operation, wherein the identification processing identifies i) when the slide operation is the single touch operation, and ii) when the slide operation is the multi-touch operation, and wherein i) the display control processing is performed only one time when the identified slide operation is the single touch operation, and ii) the display control processing is automatically performed repeatedly and continuously at predetermined time intervals when the identified slide operation is the multi-touch operation, wherein, i) the single finger sliding motion operation comprises a plurality of operations along the first direction with different respective first slide lengths, in a first of the plural operations the first direction is horizontally oriented over one or more of the screens and in a second of the plural operations the first direction is vertically oriented over one or more of the screens, ii) a two-finger simultaneously sliding motion operation comprises a plurality of corresponding two-finger simultaneously sliding operations along the first direction with different respective first slide lengths, in a first of the plural operations the first direction is horizontally oriented over one or more of the screens and in a second of the plural operations the first direction is vertically oriented over one or more of the screens, the identification processing further identifies i) when the slide operation is the single touch operation limited to one screen, ii) when the slide operation is the single touch operation over plural screens, iii) when the slide operation is the multi-touch operation limited to one screen, and iv) when the slide operation is the multi-touch operation over plural screens; and the display control processing performs different respective display controls, corresponding to the identified slide operation including:

i) first display controls when the slide operation is the single touch operation limited to one screen and when the slide operation is the corresponding multi-touch operation limited to one screen, the first display controls being performed only one time when the identified slide operation is the single touch operation, and the first display controls being automatically performed repeatedly and continuously at predetermined time intervals when the identified slide operation is the corresponding multi-touch operation, and ii) second display controls when the slide operation is the single touch operation over plural screens and when the slide operation is the corresponding multi-touch operation over plural screens, the second display controls being performed only one time when the identified slide operation is the single touch operation, and the second display controls being automatically performed repeatedly and continuously at predetermined time intervals when the identified slide operation is the corresponding multi-touch operation.

* * * * *